(12) United States Patent
Cousins et al.

(10) Patent No.: US 10,944,156 B2
(45) Date of Patent: Mar. 9, 2021

(54) WIRELESS EARPHONE ANTENNAS

(71) Applicant: Apple Inc., Cupertino, CA (US)

(72) Inventors: Benjamin A. Cousins, Cupertino, CA (US); Carlo Di Nallo, Belmont, CA (US); Ethan L. Huwe, Sunnyvale, CA (US); Jerzy S. Guterman, Sunnyvale, CA (US); Joachim S. Hammerschmidt, Mountain View, CA (US); Mattia Pascolini, San Francisco, CA (US); Ruben Caballero, San Jose, CA (US); Samuel G. Parker, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 663 days.

(21) Appl. No.: 15/721,532

(22) Filed: Sep. 29, 2017

(65) Prior Publication Data

US 2019/0103661 A1    Apr. 4, 2019

(51) Int. Cl.
*H01Q 1/27* (2006.01)
*H01Q 9/04* (2006.01)
*H04B 1/3827* (2015.01)
*H04R 1/10* (2006.01)
*H01Q 9/42* (2006.01)
*H01Q 21/30* (2006.01)
*H01Q 7/00* (2006.01)

(52) U.S. Cl.
CPC ............... *H01Q 1/273* (2013.01); *H01Q 7/00* (2013.01); *H01Q 9/0421* (2013.01); *H01Q 9/42* (2013.01); *H01Q 21/30* (2013.01); *H04B 1/385* (2013.01); *H04R 1/1016* (2013.01); *H04R 1/1041* (2013.01); *H04R 1/1058* (2013.01); *H04R 2225/51* (2013.01); *H04R 2420/07* (2013.01)

(58) Field of Classification Search
CPC combination set(s) only.
See application file for complete search history.

(56) References Cited

U.S. PATENT DOCUMENTS

| 8,948,412 B2 | 2/2015 | Lee et al. |
| 9,300,386 B2 | 3/2016 | Knowles |

(Continued)

OTHER PUBLICATIONS

McAuliffle et al., U.S. Appl. No. 15/255,801, filed Sep. 2, 2016.

*Primary Examiner* — Graham P Smith
*Assistant Examiner* — Jae K Kim
(74) *Attorney, Agent, or Firm* — Treyz Law Group, P.C.; Tianyi He

(57) ABSTRACT

An electronic device such as a wireless earbud may have antenna structures that are configured to form one or more antenna portions or antennas for transmitting and receiving wireless signals. The device may include control circuitry that is configured to selectively activate one or more antennas or antenna portions to transmit and receive wireless signals for the device. The device may include sensor circuitry that provide sensor data to the control circuitry. The control circuitry may use the sensor data to select and activate an optimal antenna based on the orientation of the earbud or the environment of the device. The antennas may be formed on opposing sides of a housing for the device. By providing configurable antenna structures, the device may be configured to adapt to the current environment and efficiently perform communications operations.

20 Claims, 8 Drawing Sheets

(56) References Cited

U.S. PATENT DOCUMENTS

| | | | | |
|---|---|---|---|---|
| 9,466,872 B2* | 10/2016 | Sanchez | ................ | H01Q 21/30 |
| 9,602,909 B2 | 3/2017 | Asrani et al. | | |
| 2010/0054512 A1* | 3/2010 | Solum | ................... | H04R 25/30 |
| | | | | 381/315 |
| 2012/0046003 A1* | 2/2012 | Ying | ...................... | H04B 1/406 |
| | | | | 455/90.2 |
| 2012/0269076 A1* | 10/2012 | Lenaerts | ................. | H04B 5/06 |
| | | | | 370/252 |
| 2013/0127670 A1* | 5/2013 | Desclos | ................ | H01Q 1/243 |
| | | | | 343/700 MS |
| 2013/0307740 A1* | 11/2013 | Pajona | .................... | H01Q 7/00 |
| | | | | 343/748 |
| 2014/0120983 A1* | 5/2014 | Lam | .................... | H04M 1/0283 |
| | | | | 455/557 |
| 2016/0322701 A1* | 11/2016 | Lin | .......................... | H01Q 3/24 |
| 2017/0201821 A1 | 7/2017 | McAuliffe et al. | | |
| 2018/0367899 A1* | 12/2018 | Lee | .......................... | H01Q 3/24 |
| 2020/0103486 A1* | 4/2020 | Knaappila | ................. | G01S 5/04 |
| 2020/0119592 A1* | 4/2020 | Hosseini | ................. | H02J 50/23 |
| 2020/0177995 A1* | 6/2020 | Montreevat | ............ | G06F 3/017 |

* cited by examiner

WIRELESS EARPHONE ANTENNAS

BACKGROUND

This relates generally to electronic devices and, more particularly, to electronic devices with wireless circuitry.

Electronic devices such as electronic accessories for cellular telephones, computers, and other electronic equipment often include wireless circuitry. For example, headsets or earbuds are available that communicate wirelessly with cellular telephones and other equipment.

Challenges can arise in implementing wireless communications circuitry in a compact device such as an earbud. If care is not taken, antennas will not perform effectively. This can make it difficult or impossible to achieve desired levels of wireless communications performance.

It would therefore be desirable to be able to provide devices such as headsets or earbuds with improved wireless circuitry.

SUMMARY

An electronic device such as a wireless earbud may have antenna structures that are configured to form a plurality of antennas or antenna portions for transmitting and receiving wireless signals. In particular, the antenna structures may be configured to form a first antenna in a first mode of operation and a second antenna in a second mode of operation.

The antenna structures may be coupled to transceiver circuitry. Switching circuitry may be interposed between the transceiver circuitry and antenna feeds of respective antennas or antenna portions formed from the antenna structure. The device may include control circuitry that is configured to selectively activate one or more antennas of the plurality of antennas (or one or more antenna portions of the antenna structures) to transmit and receive wireless signals for the device by selecting a state of the switching circuitry. For example, a first state of the switching circuitry may couple the transceiver circuitry to an antenna feed of the first antenna or antenna region, and a second state of the switching circuitry may couple the transceiver circuitry an antenna feed of the second antenna or antenna region.

The device may include additional components, on which the antenna structures or portions of the antenna structures are formed. The additional components may include a battery or grounding structure.

The device may include sensor circuitry that provide sensor data to the control circuitry. The control circuitry may use the sensor data to select one or more optimal antennas based on the orientation of the device or the environment in which the device lies. By providing configurable antenna structures, the device may be configured to adapt to any environment and efficiently perform communications operations.

DETAILED DESCRIPTION

Figure 1:
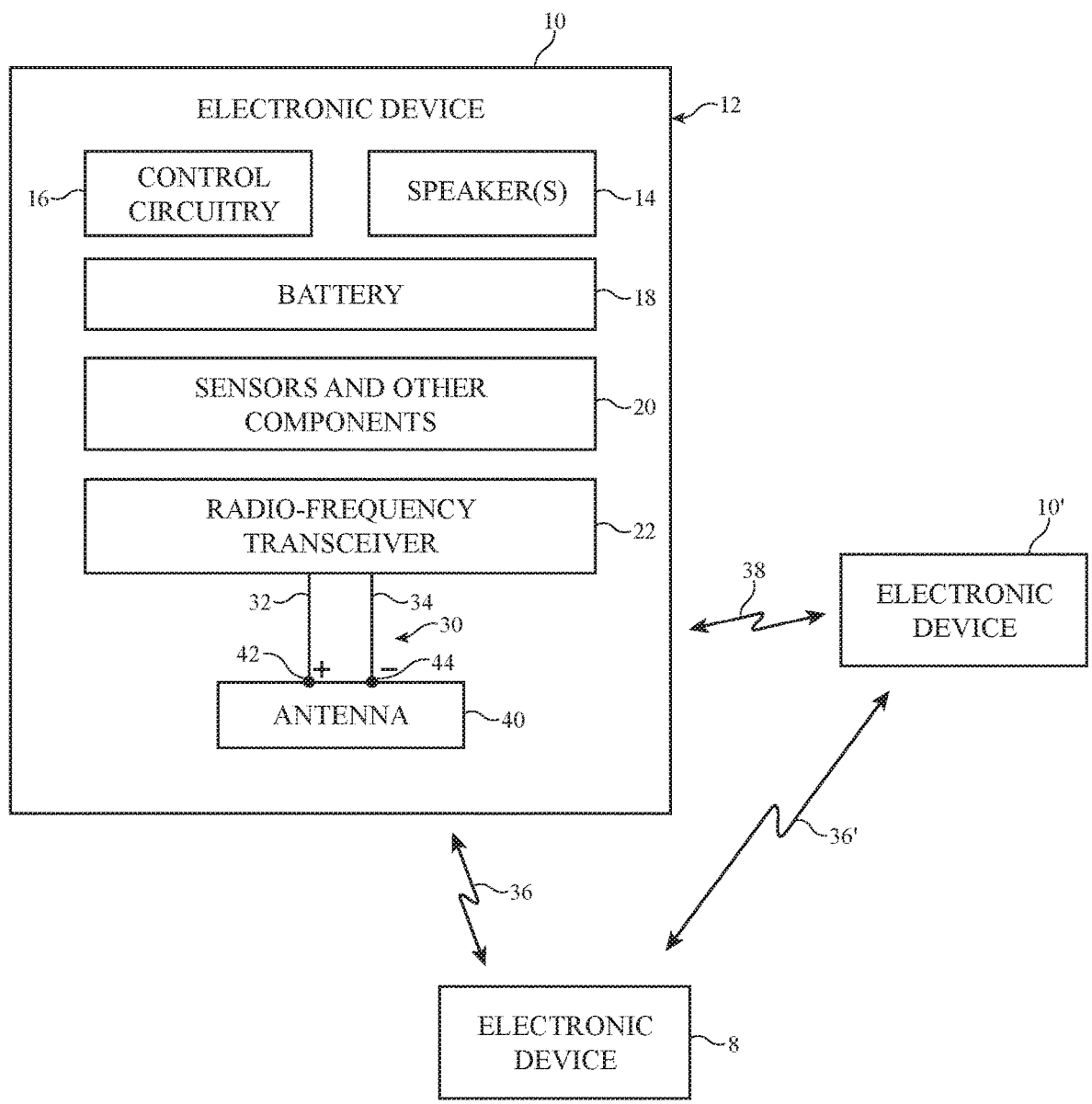
FIG. 1 is a schematic diagram of an illustrative electronic device with wireless circuitry in accordance with an embodiment.

An electronic device of the type that may be provided with wireless circuitry is shown in FIG. 1. Device 10 of FIG. 1 may be a wireless accessory such as a wireless headset, wireless headphones, a wireless earbud or earphone, or other small portable accessory. Device 10 may be used in conjunction with another electronic device such as electronic device 8 if desired.

Electronic device 8 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station (e.g., a wireless router or other equipment for routing communications between other wireless devices and a larger network such as the internet or a cellular telephone network), a desktop computer, a keyboard, a gaming controller, a computer mouse, a mousepad, a trackpad or touchpad, equipment that implements the functionality of two or more of these devices, or other electronic equipment. The above-mentioned examples are merely illustrative. Other configurations may be used for electronic devices if desired. If desired, electronic device 8 may also be referred to herein as an audio source, an audio device, or a wireless audio source (e.g., because device 8 may provide audio data to device 10 for performing playback operations on the audio data). If desired, device 10 may be a different type of electronic equipment than device 8. Configurations in which device 10 is a wireless accessory may sometimes be described herein as an example.

If desired, device 10 may also communicate with another accessory electronic device such as electronic device 10'. In particular, device 10' may also be a wireless accessory such as a wireless headset, a wireless earbud or earphone, or other smaller portable accessory (e.g., device 10' and device 10 may both be the same type of device). Device 10 and 10' may form a device pair that operate together, such as to play back audio data. For example, device 10 and 10' may both be earbuds or earphones in a pair of earbuds or earphones.

This is merely illustrative. If desired, device 10 and 10' may operate in combination under any other suitable configurations.

Devices such as device 10 may communicate wirelessly with external electronic equipment such as device 8 over wireless communications link 36. Similarly, device 10' may communicate wirelessly with device 8 over wireless communications link 36'. Additionally, device 10 may communicate with matching device 10' over wireless communications link 38. Communications link 38 may be wired if desired (e.g., link 38 may be implemented using wires or other conductive paths). If desired, one of communications links 36 and 36' may be omitted. As an example, in a scenario in which only communications link 36 is established, device 10' may communicate with device 8 through device 10 (e.g., using communications links 36 and 38, thereby omitting link 36'). In another suitable arrangement, communications link 38 may be omitted. In this scenario, device 8 may communicate with devices 10 and 10' using communications links 36 and 36' respectively, and devices 10 and 10' may communicate with each other through device 8.

Wireless communications links 36, 36', and 38 may be cellular telephone links (e.g., wireless links at frequencies of 700 MHz to 2700 MHz or other suitable cellular telephone frequencies), may be wireless local area network links operating at 2.4 GHz, 5 GHz, or other suitable wireless local area network frequencies, may be Bluetooth® links operating at 2.4 GHz or other suitable wireless personal area network frequencies, may involve millimeter wave communications, may involve near-field communications, or may involve wireless communications in other communications bands. Configurations in which devices 10 and 10' operate at 2.4 GHz to support short-range communications such as Bluetooth® communications may sometimes be described herein as an example.

As shown in FIG. 1, device 10 (e.g., a headset or other accessory) may include control circuitry such as storage and processing circuitry 16. Storage and processing circuitry 16 may include storage such as nonvolatile memory (e.g., flash memory or other electrically-programmable-read-only memory configured to form a solid-state drive), volatile memory (e.g., static or dynamic random-access-memory), etc. Processing circuitry in storage and processing circuitry 16 may be used to control the operation of device 10. This processing circuitry may be based on one or more microprocessors, microcontrollers, digital signal processors, baseband processor integrated circuits, application specific integrated circuits, etc.

Storage and processing circuitry 16 may be used to run software on device 10. The software may handle communications, may process sensor signals and take appropriate action based on the processed sensor signals (e.g., to turn on or off functions in device 10, to start or stop audio playback, etc.), and may handle other device operations. To support interactions with external equipment 8, storage and processing circuitry 16 may be used in implementing communications protocols. Communications protocols that may be implemented using storage and processing circuitry 16 include wireless local area network protocols (e.g., IEEE 802.11 protocols—sometimes referred to as WiFi® and WiGig), protocols for other short-range wireless communications links such as the Bluetooth® protocol or other wireless personal area network protocols, cellular telephone protocols, etc.

Device 10 may include microphones, speakers, tone generators, and other audio components (see, e.g., one or more speakers 14). Microphones may gather voice signals and/or ambient noise signals for noise cancellation functions. Speakers may play back sound for a user. Device 10 may, for example, be a wireless earbud or earphone that plays audio for a user using speaker 14 when at least some of device 10 is placed on, over, or within a user's ear. Device 10 may be paired to another device such as an additional earbud (e.g., device 10'). Device 10 may form an earbud pair with the additional earbud. Device 10 and the additional earbud may wirelessly communicate with an audio source (e.g., audio source 8 via communications links 36 and 36') and/or may communicate with each other (e.g., for conveying audio data from the audio source to device 10 and device 10' and/or for conveying audio data between the earbuds via communications link 38). The speaker in device 10 may play a first channel of stereo audio data (e.g., a left or right channel) whereas the speaker in device 10' may play a second channel of stereo audio data. Tone generators and other sound output devices may generate other audible or non-audible outputs. Sensors and other components 20 in device 10 may include proximity sensors (e.g., capacitive proximity sensors, light-based proximity sensors, etc.), force sensors, buttons, magnetic sensors, accelerometers and other components for measuring device orientation and/or motion, strain gauge sensors, vibrators, connector components, printed circuit board structures, wiring structures, etc.

Device 10 may include battery 18 to provide power to the circuitry of device 10. Battery 18 may be, for example, a rechargeable battery. Battery 18 may be recharged wirelessly (e.g., by providing device 10 with wireless power) or may be recharged via a wired connection between external equipment and device 10. Configurations in which battery 18 is not rechargeable (e.g., in which battery 18 is a replaceable non-rechargeable battery) may also be used. Components 20 may include, if desired, a connector that is configured to receive a cable or other structure that, when connected to the connector, provide power to device 10 for charging battery 18.

The components of device 10 may be housed within device housing 12, which may sometimes be referred to as an enclosure or case. Housing 12 may, for example, be formed from of plastic, glass, ceramics, fiber composites, metal (e.g., stainless steel or aluminum), other dielectrics such as silicone, foam, or rubber, or a combination of any two or more of these materials. If desired, housing 12 may include an internal frame structure that is enclosed within other housing structures such as a silicone, rubber, or plastic outer casing. The outer casing may include combinations of these materials if desired. Housing 12 may, if desired, include earbud housing structures (e.g., rubber, plastic, or silicone housing structures that are sometimes referred to as earbud tip structures) that enclose speaker 14 but that are otherwise separated from other portions of housing 12. The portions of housing 12 that cover speaker 14 may include a hole or other openings that align with speaker 14 to allow sound to be conveyed from speakers 14 to the exterior of device 10. If desired, a conductive and/or dielectric mesh or other protective layer may be formed over the opening to protect the opening and the speaker from contaminants.

Electronic device 10 may include wireless circuitry for supporting wireless communications with external equipment. The wireless circuitry may include radio-frequency transceiver 22 and one or more antennas such as antenna 40. Antenna 40 may have a feed that includes positive antenna feed terminal 42 and ground antenna feed terminal 44. Transmission line 30 may be used to couple radio-frequency transceiver circuitry 22 to antenna 40. Transmission line 30 may have a positive signal path such as line 32 and a ground signal path such as line 34. More than one feed may be used for antenna 40 if desired (e.g., each feed may be coupled to a corresponding transmission line 30). Transmission lines in device 10 such as transmission line 30 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Circuitry 22 may include any desired circuitry associated with the transmission and reception of radio-frequency signals using antenna 40. For example, circuitry 22 may include baseband processor circuitry, amplifier circuitry (e.g., low noise and/or power amplifier circuitry), mixing circuitry such as up-converter and/or down-converter circuitry, converter circuitry such as analog-to-digital converter circuitry and/or digital-to-analog converter circuitry, etc.

Antenna 40 may be formed using any suitable antenna type. For example, antenna 40 may be an antenna with a resonating element that is formed from a loop antenna structure, a patch antenna structure, an inverted-F antenna structure, a slot antenna structure, a planar inverted-F antenna structure, a helical antenna structure, a monopole, a dipole, hybrids of these designs, etc. If desired, antenna 40 may include tunable circuitry and control circuitry 16 may be used to select an optimum setting for the tunable circuitry to tune antenna 40. Antenna adjustments may be made to tune antenna 40 to perform communications in a desired frequency range or to otherwise optimize antenna performance. Antenna 40 may also be implemented using a fixed (non-tunable) configuration if desired. Multiple antennas 40 may be formed within device 10 if desired.

Device 10' may include some or all of the same circuitry as device 10. In particular, device 10' may include control circuitry, one or more speakers, a battery, sensor circuitry, transceiver circuitry, antenna structure, housing structures, and any other components described in connection with device 10. Devices 10 and 10' may be enclosed by separate housing structures, or if desired, devices 10 and 10' may be enclosed by a shared housing structure.

If desired, the housing of device 10' may have the same shape as the housing of device 10. While the housings of device 10' and device 10 may be substantially identical, devices 10 and 10' may be configured to perform different functions. For example, during audio playback operations, device 10 may be configured to perform left-channel specific operations, while device 10' may be configured to perform right-channel specific operations in a multiple-channel audio configuration (e.g., a stereo configuration). As an example, device 10 may be an earbud configured to be placed in a left ear of a user and device 10' may be an earbud configured to be placed in a right ear of the user. These examples of device 10' are merely illustrative. As an example, details of device 10 (e.g., internal structures of device 10, functionality of device 10, etc.) described herein may similarly describe device 10'. Device 10 may be configured to perform right-channel specific operations whereas device 10' performs left-channel specific operations if desired.

Figure 2:
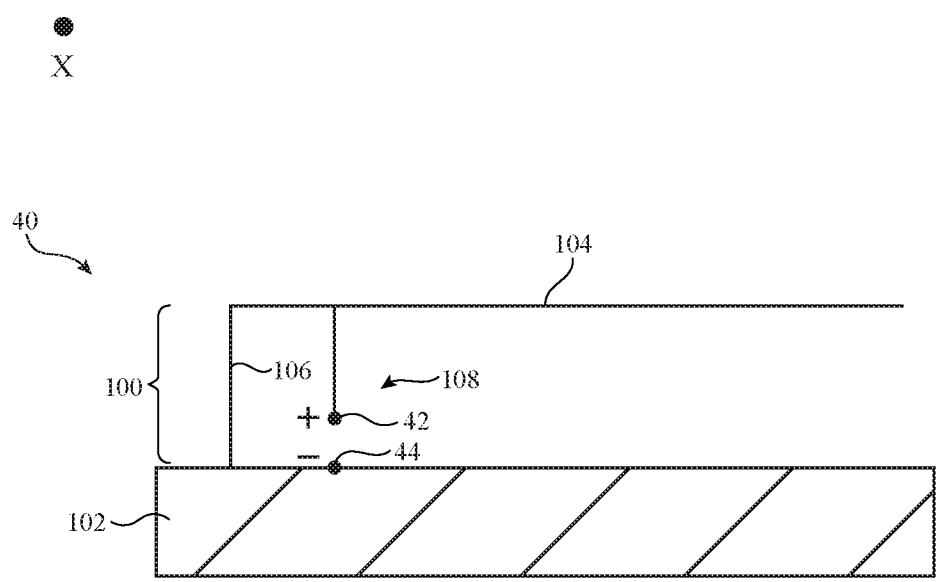
FIG. 2 is a schematic diagram of an illustrative antenna of the type that may be used in an electronic device in accordance with an embodiment.

An illustrative configuration for antenna 40 is shown in FIG. 2. In the example of FIG. 2, antenna 40 is an inverted-F antenna and has inverted-F antenna resonating element 100 and antenna ground 102 (sometimes referred to herein as ground 102, antenna ground plane 102, or ground plane 102). Antenna resonating element 100 may have a main resonating arm such as arm 104. The length of arm 104 may be selected such that antenna structure 40 resonates at desired operating frequencies. For example, the length of arm 104 (or a branch of arm 104) may be a quarter of a wavelength at a desired operating frequency for antenna 40. Antenna structure 40 may also exhibit resonances at harmonic frequencies. If desired, slot antenna structures or other antenna structure may be incorporated into an inverted-F antenna such as antenna 40 of FIG. 2 (e.g., to enhance antenna response in one or more communications bands).

Antenna 40 may be fed by coupling a transmission line (e.g., transmission line 30 of FIG. 1) to antenna feed 108. Antenna feed 108 has positive antenna feed terminal 42 coupled to resonating element arm 104 of antenna resonating element 100 and has ground antenna feed terminal 44 coupled to ground 102. Return path 106 (i.e., a short circuit path) may be coupled between antenna resonating element arm 104 and ground 102 in parallel with feed 108. If desired, inverted-F antenna structures such as illustrative antenna structure 40 of FIG. 2 may have more than one resonating arm branch (e.g., to create multiple frequency resonances to support operations in multiple communications bands) or may have other antenna structures (e.g., parasitic antenna resonating elements, tunable components to support antenna tuning, etc.). If desired, antennas such as inverted-F antenna 40 of FIG. 2 may have tunable components.

Antenna ground 102 may be formed from ground traces in a printed circuit or other substrate, metal portions of a battery, metal housing structures, metal portions of internal device components, metal walls of a speaker or an acoustic cavity, other conductive ground structures, or a combination of these structures in device 10. Antenna resonating element 100 may be formed from metal printed circuit traces and/or other conductive structures in device 10 (e.g., metal foil, metal housing structures, stamped sheet metal, portions of internal device components, etc.).

If desired, antenna 40 may be a planar inverted-F antenna. When configured as a planar inverted-F antenna, resonating element arm 100 may be formed using a conductive structure that extend across a planar lateral area above ground 102 (e.g., a conductive sheet, a conductive trace, conductive foil, etc. that is separated from ground 102 by a predetermined distance). The perimeter of the conductive structure forming resonating element arm 100 may help to define the resonant frequency of antenna 40, for example.

When antenna 40 transmits radio-frequency signals provided by transceiver circuitry, the performance of antenna 40 may be hindered by external objects in proximity of antenna 40 (e.g., the presence of an external object in the vicinity of antenna 40 may load and thus detune antenna 40). Such loading and detuning may be particularly pronounced when antenna 40 is loaded close to antenna feed 108. For example, when an external object is present in close proximity to feed 108 such as at location X, antenna 40 may be significantly loaded by the external object causing antenna 40 to become mismatched with the impedance of transmission line 30. This may cause antenna 40 to become detuned or to otherwise exhibit deteriorated antenna performance. However, when an external object is present at location that is relatively far from feed 108 such as location Y, antenna 40 may be detuned (e.g., the antenna efficiency may be degraded) less than in scenarios where the external object is at location X.

In practice, when device 10 is placed within a user's ear, the loading of antenna 40 and thus the radio-frequency performance of antenna 40 may be dependent upon how device 10 is placed (e.g., rotated) within the ear. For example, different parts of the user's ear or body may load antenna 40 more than others. In practice, it may be desirable to orient device 10 within the user's ear in such a way so as to place portions of the user's ear that significantly load antenna 40 farther from feed 108 than portions of the user's ear that do not significantly load antenna 40.

Additionally, in general, playback operations may provide audio data for multi-channel playback (e.g., dual-channel or stereo playback), thereby requiring earphones to provide first and second audio channels (e.g., a left (ear) audio channel and a right (ear) audio channel, etc.). In practice, earphones may have an asymmetric housing that is specific for a particular channel or placement (e.g., the housing of an earbud for playing the left audio channel may be shaped to only fit within a user's left ear and not the user's right ear and the housing of an earbud for playing the right audio channel may be shaped to only fit within a user's right ear and not the user's left ear). In other words, a left-ear earbud in this scenario cannot be used as a right-ear earbud and vice versa.

However, in practice it would desirable to provide a symmetric housing for earphone devices (e.g., devices 10 and 10' of FIG. 1). A symmetric housing would allow either one of devices 10 and 10' to be placed in either the user's left or right ear. This may, for example, facilitate the use of devices 10 and 10' as earbuds for a user, because the user does not need to focus on ensuring that the correct earbud goes into a particular corresponding ear.

In this scenario, sensor circuitry or other circuitry may provide sensor data to the control circuitry in earphone devices 10 and 10' so that the devices are aware of which ear they are placed in. Once this information is identified, the control circuitry may communicate with device 8 (e.g., over link 36 of FIG. 1) to begin receipt of wireless audio data for the audio channel corresponding to the appropriate ear in which each device is placed. However, if care is not taken, the antenna feed may be located close to a portion of the user's ear or a portion the user's body that significantly loads the corresponding antenna, which causes the antenna to be detuned. Details of illustrative antenna structures that may be implemented within devices 10 and 10' to mitigate these issues are described below.

Figure 3:
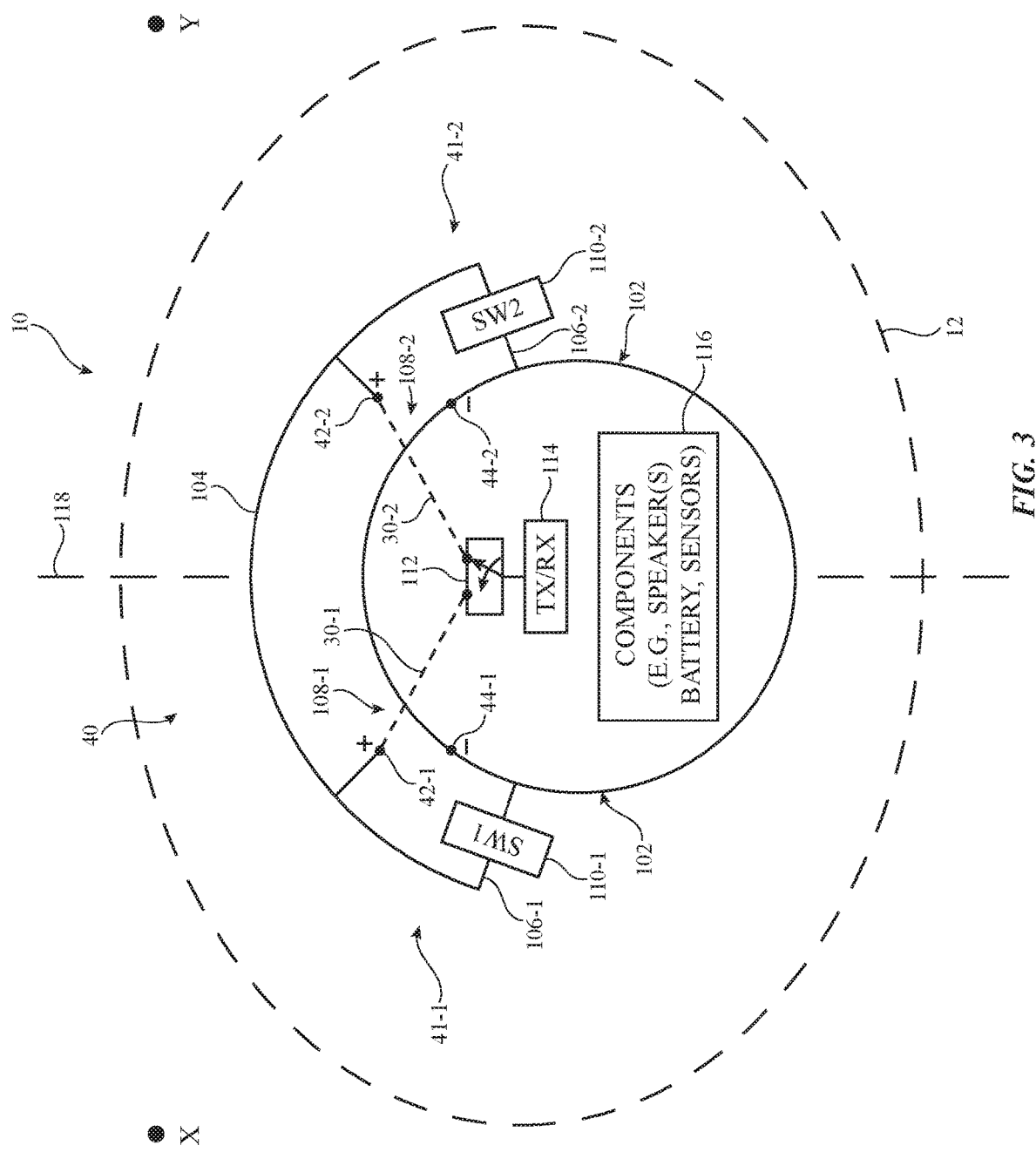
FIG. 3 is a schematic diagram of an illustrative electronic device having antenna structures with switchable antenna configurations in accordance with an embodiment.

FIG. 3 shows an illustrative electronic device 10 such as a headset, an earphone, an earbud, or any other playback device or accessory, having illustrative antenna structures with switchable configurations. As shown in FIG. 3, antenna structures 40 in electronic device 10 may have multiple antenna feeds such as feeds 108-1 and 108-2. Antenna feed 108-1 may be formed at a first side 41-1 of antenna 40 (sometimes referred to herein as antenna portion 41-1 or antenna region 41-1). Antenna feed 108-2 may be formed at a second side 41-2 of antenna 40 (sometimes referred to herein as antenna portion 41-2 or antenna region 41-2). Antenna feed 108-1 may include a positive feed terminal 42-1 coupled to resonating element arm 104 of antenna 40 and a ground terminal 44-1 coupled to ground 102. Antenna feed 108-2 may include a positive feed terminal 42-2 coupled to resonating element arm 104 and a ground feed terminal 44-2 coupled to ground 102. Respective transmission lines (e.g., transmission lines such as transmission line 30 of FIG. 1) may couple feeds 108-1 and 108-2 to transceiver circuitry 114 (e.g., transceiver circuitry 22 of FIG. 1). For example, a first transmission line 30-1 may couple feed 108-1 to transceiver circuitry 114 whereas a second transmission line 30-2 may couple feed 108-2 to transceiver circuitry 114.

A first return path 106-1 may be coupled between one end of resonating element arm 104 and ground 102 (e.g., within antenna region 41-1). A second return path 106-2 may be coupled between the opposing end of arm 104 and ground 102 (e.g., within antenna region 41-2). As an example, ground 102 may be formed using one or more components 116. Components 116 that are used in forming ground 102 may, for example, include a conductive portion (e.g., a conductive casing or frame) of a battery (e.g., battery 18 of FIG. 1), a conductive portion of a speaker, a conductive portion a sensor, and/or a conductive wall of an acoustic chamber. If desired, antenna 40 may be mounted to components 116 (e.g., return paths 106-1 and 106-2 may be soldered or welded to components 116).

Device 10 may include switching circuitry for adjusting antenna 40 between at least two different antenna configurations. For example, device 10 may include switching circuitry 110-1 interposed on return path 106-1 and switching circuitry 110-2 interposed on return path 106-2. If desired, antenna feed switching circuitry 112 (sometimes referred to herein as feed selection switching circuitry) may be coupled between transceiver circuitry 114 and feeds 108-1 and 108-2 (e.g., switching circuitry 112 may be interposed on transmission lines 30-1 and 30-2). Control circuitry (e.g., control circuitry 16 of FIG. 1) may provide control signals to switching circuitry 112, 110-1, and 110-2 to control the antenna configuration of antenna 40. For example, circuitry 110-1 and 110-2 may be controlled to selectively couple one or both sides of resonating element arm 104 to ground 102. Circuitry 112 may be controlled to selectively couple one of feeds 108-1 and 108-2 to transceiver circuitry 114 (e.g., so that one of feeds 108-1 and 108-2 is active at a given time).

As an example, the control circuitry on device 10 may configure antenna 40 to operate in a selected one of first and second antenna configurations. In the first configuration, switch 110-1 may be closed (turned on or enabled), switch 110-2 may be open (turned off or disabled), and switching circuitry 112 may couple transceiver circuitry 114 to feed 108-1 (e.g., feed 108-1 may be enabled whereas feed 108-2 is disabled). In this first configuration, antenna return path 106-1 may be coupled between antenna resonating element arm 104 and ground 102 and feed 108-1 may be active within region 41-1 of antenna 40. At the same time, return path 106-2 may form an open circuit between the end of resonating element arm 104 in region 41-2 and ground 102.

In the second configuration, control circuitry switch 110-2 may be closed, switch 110-1 may be open, switching circuitry 112 may couple transceiver circuitry 114 to feed 108-2, and feed 108-1 may be disabled. In this second configuration, antenna return path 106-2 may be coupled between antenna resonating element arm 104 and ground 102 and feed 108-2 may be active within region 41-2 of antenna 40. At the same time, return path 106-1 may form an open circuit between the end of resonating element arm 104 in region 41-2 and ground 102.

Device 10 may include housing 12 that encloses (e.g., surrounds) antennas regions 41-1 and 41-2, and other components (e.g., speakers, battery, sensors, processing circuitry, etc.) within device 10. Housing 12 may have any suitable shape. As examples, housing 12 may have a main body portion that is anatomical to an ear of a user (e.g., that has a shape that fits within the ear of the user) and an elongated portion that protrudes from the main body portion, may have two separate elongated portions that protrude from two different sides of the main body portion, may have no elongated portions and only a main body portion, etc. As an example, housing 12 may have mirror symmetry (i.e., plane symmetry) about at least one plane of symmetry within device 10 (e.g., a central plane indicated by dashed plane 118 perpendicular to the page). If desired, housing 12 may also have mirror symmetry about an additional plane of symmetry and/or may have rotational symmetry about a central axis. These examples are merely illustrative. If desired, housing 12 may have any one or more of the above-mentioned characteristics.

By providing device 10 with a symmetrical housing, device 10 may be placed in either one of the user's ears such that the speaker port of device 10 is aligned with the ear canal of the respective ear. Device 10 may still provide satisfactory antenna performance using antenna 40 in either one of the user's ears by placing antenna 40 in one of the first or second configurations (e.g., by coupling different antenna feeds and/or antenna return paths to transceiver circuitry).

Antenna 40 may be toggled between the first and second antenna configurations to efficiently operate in the presence of external objects. As an example, in a first environment, an external object may be located at location Y. The external object may be located significantly closer to feed 108-2 of antenna portion 41-2 than to feed 108-1 of antenna portion 41-1. As a result, in the first environment, antenna portion 41-1 may operate more efficiently as the active portion of antenna 40 than antenna portion 41-2 (e.g., antenna 40 may be significantly detuned if feed 108-2 is active). In other words, in the first environment, antenna 40 on device 10 may operate in the first configuration (e.g., a configuration in which feed 108-1 is active and return path 106-1 is coupled into use and feed 108-2 is inactive) instead of operating in the second configuration (e.g., a configuration in which feed 108-1 is inactive and feed 108-2 is active).

As another example, in a second environment, an external object may be located at location X. The external object may be located significantly closer to feed 108-1 of antenna portion 41-1 than to feed 108-2 of antenna portion 41-2. As a result, in the second environment, antenna portion 41-2 may operate more efficiently as the active portion of antenna 40 than antenna 41-1 (e.g., antenna 40 may be significantly detuned if feed 108-1 is active). In other words, in the second environment, antenna 40 on device 10 may operate in the second configuration (e.g., a configuration in which feed 108-1 is inactive and feed 108-2 is active and return path 106-1 is couple into use) instead of operating in the first configuration.

Control circuitry 16 on device 10 may actively receive sensor data that monitors the environment of device 10 (e.g., determine whether device 10 is in the first or second environment, is in an environment more closely resembling the first or second environment, etc.) and adjust the configuration of the antenna structures on device 10 accordingly to maximize antenna efficiency, thereby enhancing antenna performance and lowering power consumption of device 10. As described in connection with FIG. 1, device 10 may include sensors or sensor circuitry that generate the sensor data that is used to determine the current environment for device 10. By determining the current environment for device 10 using the sensor data, control circuitry 16 in device 10 may select one of the two configurations described above to implement in antenna 40. In other words, antenna 40 may implement a more optimal configuration of the two configurations with respect to the detuning characteristics of the environment. The example of FIG. 3 is merely illustrative. If desired, the structures shown in FIG. 3 may also be used in a paired device (e.g., device 10' of FIG. 1).

Figure 4:
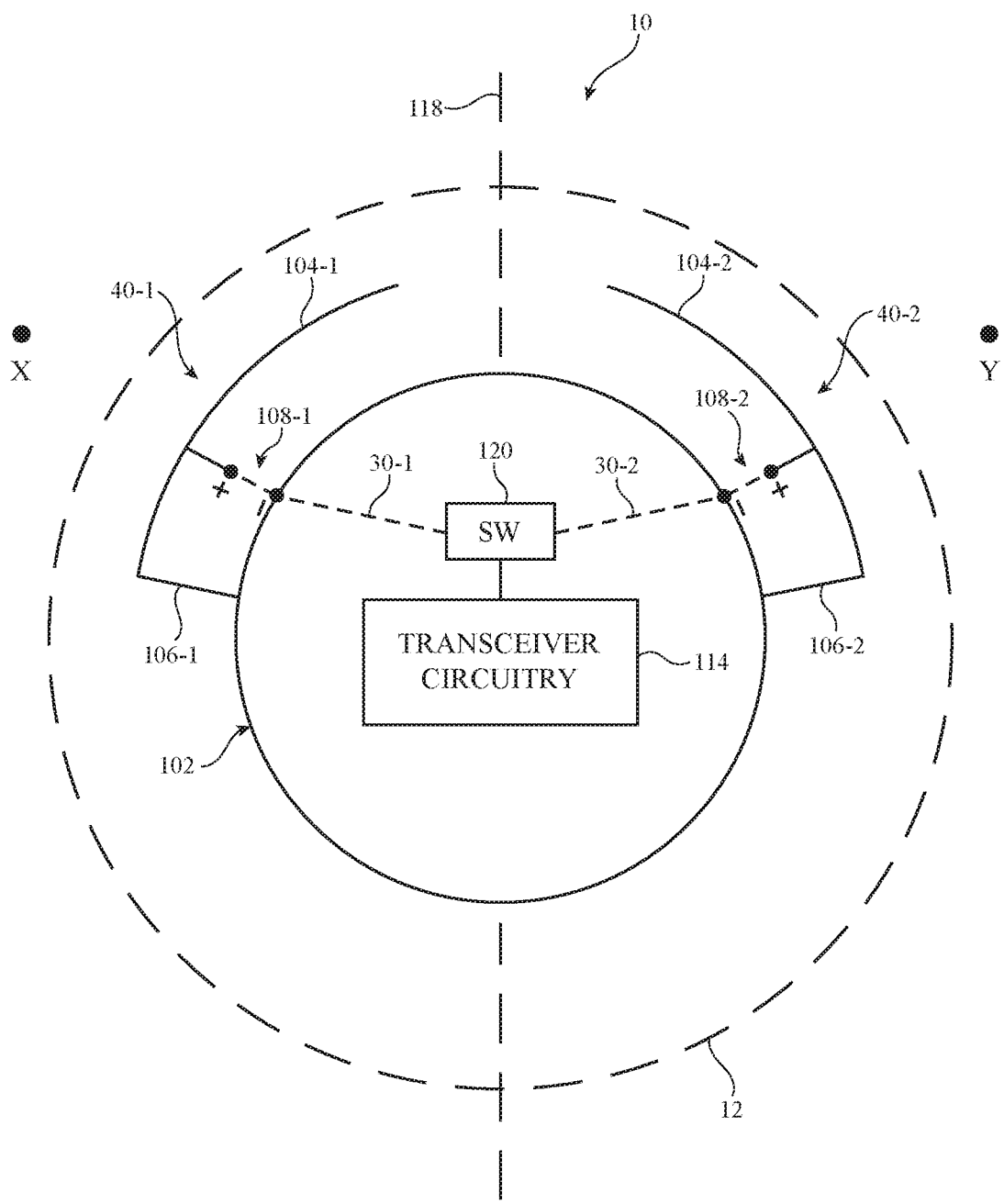
FIG. 4 is a schematic diagram of an illustrative electronic device having multiple switchable antennas in accordance with an embodiment.

While FIG. 3 shows an electronic device having a single antenna with switchable feeds and/or return paths, in another suitable embodiment, an electronic device such as device 10 may include multiple separate switchable antennas. FIG. 4 shows an illustrative electronic device 10 (e.g., a headset, earphone, earbud, etc.) that includes two separate antennas (e.g., a first antenna 40-1 and a second antenna 40-2).

As shown in FIG. 4, antenna 40-1 may include a corresponding antenna resonating arm 104-1 that conveys antenna signals for feed 108-1. Feed 108-1 may be coupled to transceiver circuitry 114 via a corresponding transmission line 30-1. Antenna 40-1 may include return path 106-1 that couples one end of antenna resonating arm 104-1 to ground 102. Similarly, antenna 40-2 may include antenna resonating arm 104-2 that conveys antenna signals for feed 108-2. Feed 108-2 may be coupled to transceiver circuitry 114 via transmission line 30-2. Antenna 40-2 may include return path 106-2 that couples one end of antenna resonating arm 104-2 to ground 102. The other end of antenna resonating arm 104-2 (e.g., the floating end of arm 104-2 not coupled to return path 106-2) may be interposed between antenna resonating arm 104-1 (e.g., the floating end of antenna resonating arm 104-1) and antenna feed 108-2. Similarly, the floating end of antenna resonating arm 104-1 may be interposed between the floating end of antenna resonating arm 104-2 and antenna feed 108-1. In this configuration, antennas 40-1 and 40-2 may be formed on opposing sides of housing 12 and/or device 10. In particular, antenna return paths 106-1 and 106-2 may be formed on opposing sides of housing 12 and/or device 10, and antenna feeds 108-1 and 108-2 may be formed on opposing sides of housing 12 and/or device 10. Antenna resonating arms 104-1 and 104-2 may be formed as separate conductors in this example.

As shown in FIGS. 3 and 4, antenna resonating arm 104 in FIG. 3 and antenna resonating arm in FIG. 4 may be curved. The curvature of these antenna resonating element arms may conform to a shape of ground structures such as ground 102, a shape of internal components such as components 116 or battery 18, and or a shape of housing 12. This is merely illustrative. If desired, antenna resonating arms in antenna 40 of FIGS. 3 and 4 may be planar and not curved.

Additionally, device 10 in FIG. 4 may also include components such as a speaker, a battery, sensor circuitry, other components, similar to components 116 described in connection with FIG. 3. If desired, additional components such as speaker(s), a battery, sensor circuitry, control circuitry, etc.) may form portions of antennas 40-1 and 40-2 (e.g., grounding structures for antennas 40-1 and 40-2) as an example. If desired, antennas 40-1 and 40-2 may be mounted to these components (e.g., return paths 106-1 and 106-2 may be soldered or welded to these components).

If desired, antenna feed switching circuitry 120 may be coupled between feeds 108-1 and 108-2 and transceiver circuitry 114 (e.g., switching circuitry 120 may be interposed between the antenna feeds and the transceiver circuitry). Switching circuitry 120 may be controlled to selectively activate a given one of antennas 40-1 and 40-2 at a time (e.g., based on the locations of external objects in the environment of device 10 or based on other sensor information).

For example, when an object is present at location Y, control circuitry 16 may configure switch 120 to couple antenna 40-1 to transceiver circuitry 114 and to decouple antenna 40-2 from transceiver circuitry 114. In this scenario, antenna 40-1 relatively far from location Y and would therefore not be significantly loaded or detuned by objects at location Y. However, antenna 40-2 is relatively close to location Y and, if active, would be significantly loaded and detuned. In contrast, when an object is present at location X, control circuitry 16 may configure switch 120 to exclusively couple antenna 40-2 to transceiver circuitry 114. In this scenario, antenna 40-2 is relatively far from location X and would therefore not be significantly loaded or detuned by objects at location X. However, antenna 40-1 is relatively close to location X and, if active, would be significantly loaded detuned. In this way, an optimal antenna that is most immune to loading and detuning by external objects may be active at any given time.

The example of FIG. 4 is merely illustrative. If desired, antennas 40-1 and 40-2 may be separately coupled to one or more transceiver circuits (e.g., switching circuitry 120 may be omitted). If desired, device 10 may include antennas or antenna structures in addition to antennas 40-1 and 40-2, and control circuitry may configure antennas 40-1 and 40-2 such that both antennas are simultaneously inactive while the additional antennas are activate.

Antennas 40-1 and 40-1 in FIG. 4 may have reflective symmetry about a central plane (e.g., a plane into and out of the page as indicated by plane 118). If desired, antennas 40-1 and 40-2 may have resonating element arms of the same length or different lengths (e.g., arms 104-1 and 104-2 may have the same or different lengths). Antennas 40-1 and 40-2 may cover the same frequencies or may cover two or more different frequencies. Using antennas having resonating element arms formed from separate conductive structures may reduce the amount of undesired current leakage relative to scenarios where the same conductive structure is used by both feeds 108-1 and 108-2 (e.g., as shown in FIG. 3).

Figure 5:
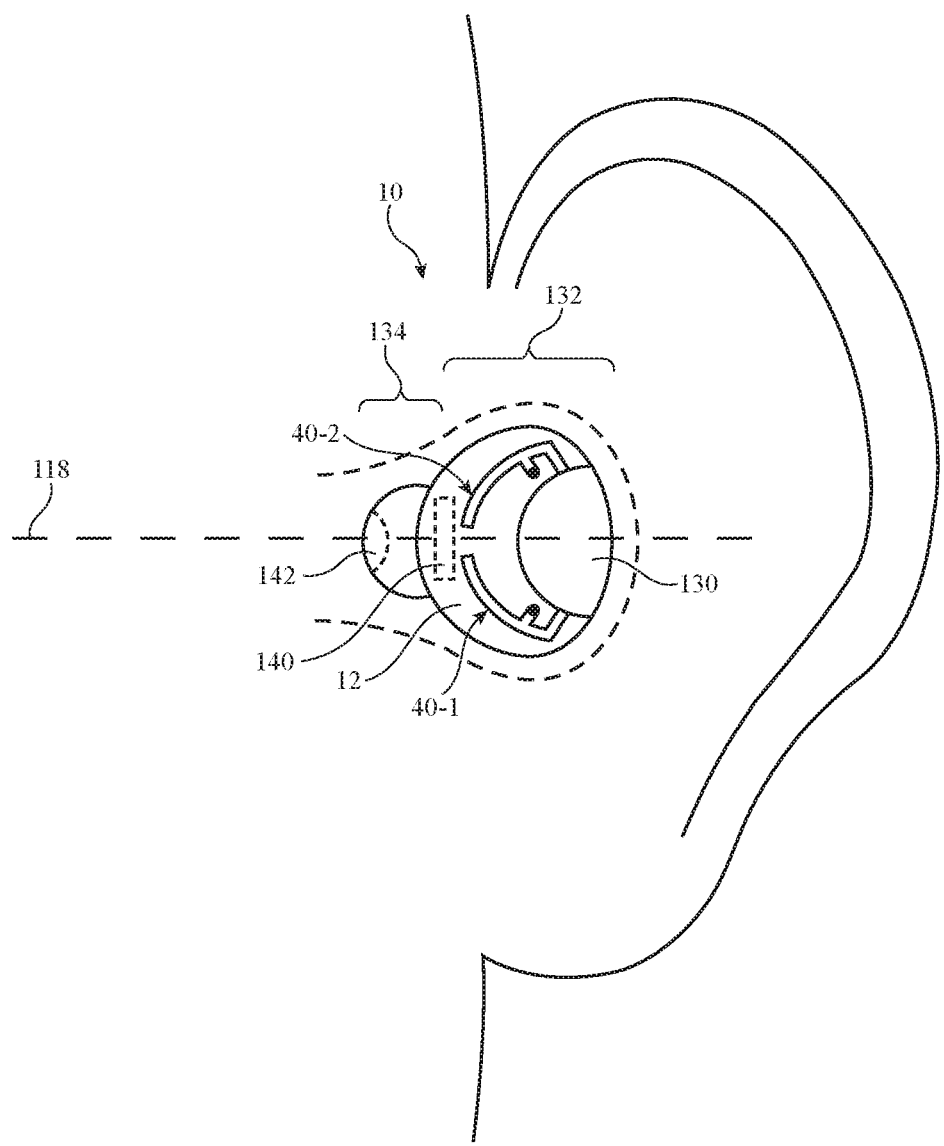
FIG. 5 is a diagram showing how an illustrative electronic device having an antenna of the type shown in FIG. 4 may be oriented with respect to the ear of a user during operation of the electronic device in accordance with an embodiment.

FIG. 5 shows a perspective view of an illustrative electronic device having antenna structures of the type shown in FIG. 4 while placed in a user's left ear. As shown in FIG. 5, device 10 may include housing 12 that surrounds components 130, antennas 40-1 and 40-2, speaker 140, and other components. Housing 12 may include a main body portion 132 and an extended or protruding portion 134. Main body portion 132 may house control circuitry, processing circuitry, transceiver circuitry, antennas, a battery, and any other suitable components. Protruding portion 134 may house speaker port 142 that may be aligned with speakers 140 for device 10. Speaker port 142 may be formed in the surface of housing 12 through which sound is provided to the ear of the user. Speaker port 142 may be formed from one or more openings in housing 12. One or more plastic or metal mesh layers may be interposed between speaker 140 and the one or more openings that form the speaker port 142 (e.g., to help prevent the intrusion of dust and other contaminants into the speaker). Speaker 140 may be formed in main body portion 132, as an example. Alternatively, protruding portion 134 may be omitted and openings that form speaker ports may be formed in main body portion 132, as an example.

Antennas 40-1 and 40-2 may be formed on (mounted to) component 130 of device 10. As examples, component 130 may include flexible substrates, rigid substrates, printed circuit substrates, a battery, a portion of housing 12, a ground plane, or any combination of these components and any additional suitable components. In particular, component 130 may be a battery, and a portion of the battery (e.g., first and second opposing sides of the battery) may form a portion of ground 102. Return paths 106-1 and 106-2 may be coupled to ground 102 at the first and second opposing sides of the battery, respectively. Component 130 such as a battery may have first and second curved surfaces (on different sides of component 130) over which antenna resonating element arms 104-1 and 104-2 are respectively formed. If desired, antenna resonating element arms 104-1 and 104-2 may extend parallel to the first and second respective curved surfaces of component 130 (e.g., resonating element arms 104-1 and 104-2 may also be curved and have the same curvature as a curved surface of component 130). Antenna structures (e.g., resonating element arms, feeds, return paths) associated with antennas 40-1 and 40-2 may have reflective symmetry about a plane into and out of the page such as plane 118, as described in connection with FIG. 4.

When device 10 is placed in the left ear of a user (as shown in FIG. 5), the antenna feed associated with antenna 40-1 (e.g., feed 108-1 as shown in FIG. 4) may be in proximity to a higher-density portion of the user's ear than antenna 40-2. The higher density portion of the user's ear will load and detune an adjacent antenna than lower density portions of the user's ear. As such, when device 10 is placed in the user's ear as shown in FIG. 5, antenna 40-1 may be loaded and detuned more than antenna 40-2.

In order to mitigate this, control circuitry 16 on device 10 may configure switching circuitry (e.g., switching circuitry 120 shown in FIG. 4) to couple feed 108-2 associated with antenna 40-2 to transceiver circuitry 114 as shown in FIG. 4, and optionally decouple feed 108-1 associated with antenna 40-1 from transceiver circuitry 114, as an example. Configured in this way, device 10 may use antenna 40-2, which is subject to less dielectric loading and detuning, to convey wireless signals. Feed 108-2 of antenna 40-2 may be pointed in an upward direction (e.g., away from the higher density portion of the ear) and away from an object at location z. By activating antenna 40-2, device 10 may exhibit improved antenna performance (e.g., less data loss, reduce risk of dropping communications link 36, etc.) than in scenarios where antenna 40-1 is activated.

Because antenna structures (e.g., antennas 40-1 and 40-2) may have at least reflective symmetry about a plane of symmetry that bisects antennas 40-1 and 40-2 into symmetrical halves, the same device 10 may also be used in a right ear of the user. In particular, when device 10 is placed in the right ear of the user, device 10 may have a configuration that is rotated about axis 118 by 180 degrees from the configuration in the user's left ear as shown in FIG. 5. In this rotated right-ear configuration, the antenna feed associated with antenna 40-2 in device 10 (e.g., the antenna feed of the downward facing antenna) may be in closer proximity to the body of the user than is the antenna feed associated with antenna 40-1 in device 10. As such, the performance of antenna 40-2 in device 10 (e.g., the downward facing antenna) may be significantly affected by the presence of the body of the user. In this scenario, control circuitry 16 on device 10 may configure switching circuitry to couple the feed associated with antenna 40-1 (e.g., the upward facing antenna) to transceiver circuitry 114 in device 10, and to optionally decouple the feed associated with antenna 40-2 from transceiver circuitry 114. As such, when device 10 is placed in the right ear of the user, the active antenna may have an antenna feed that is pointed in an upward direction and away from the body of the user. In this way, an optimal antenna may be selected based on which ear device 10 is located in, allowing a user to place device 10 in either ear without significantly impacting antenna performance.

The symmetry of antennas 40-1 and 40-2 on device 10 allows device 10 to be placed in the left ear or the right ear of the user. When placed in the right ear, control circuitry 16 may activate antenna 40-1 (e.g., the upward facing antenna) and deactivate antenna 40-2. Similarly, when placed in the left ear, control circuitry 16 may activate antenna 40-2 and deactivate antenna 40-1. By providing this flexibility in using device 10, a user is not required to place device 10 in a correct ear.

Control circuitry 16 may use sensor circuitry (e.g., sensors) in device 10 to determine the ear in which device 10 is placed (e.g., the current operating environment of device 10). As examples, sensors such as accelerometers, optical sensors, gyroscopes, proximity sensors (e.g., capacitive proximity sensors), ambient light sensors, and/or any other sensors may gather sensor data associated with the relative motion, position, and/or orientation of device 10. Control circuitry 16 may receive the gathered sensor data and use the sensor data to determine the ear in which device 10 is placed.

The examples described in connection with FIG. 5 are merely illustrative. If desired, the antenna structures shown in FIG. 3 may similarly be used in device 10. In this scenario, antenna feed 108-2 and return path 106-2 may be switched into use when device 10 is placed in the user's left ear and antenna feed 108-1 and return path 106-1 may be switched into use when device 10 is placed in the user's right ear, for example. Similar structures may also be used to form a device that is paired with device 10 (e.g., an earbud such as device 10' of FIG. 1 that forms a pair of earbuds with device 10). When configured in this way, device 10 may be operable as either a right-ear earbud or a left-ear earbud without significantly deteriorating antenna performance. This may, for example, facilitate use of device 10 by a user (e.g., so that the user need not focus on which ear device 10 is placed within) while still allowing a reliable wireless link with device 8 (e.g., thereby minimizing audio data errors and the risk of the wireless link being dropped).

Figure 6:
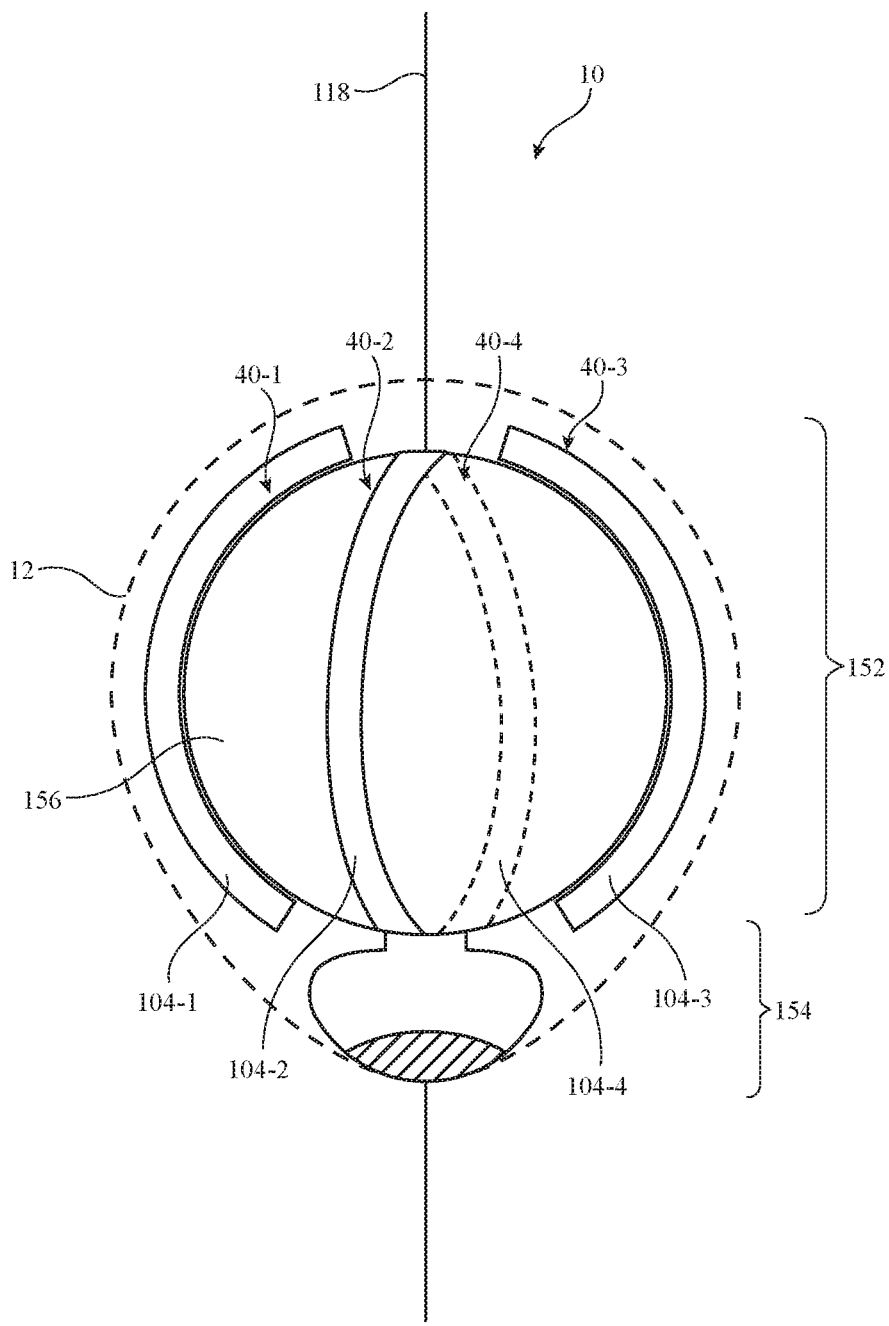
FIG. 6 is a perspective view of an illustrative electronic device such as a rotationally symmetric wireless earbud in accordance with an embodiment.

Antenna performance of antennas on device 10 as shown in FIGS. 3-5 may be sensitive to how device 10 is placed (e.g., rotated or oriented) within a user's ear canal. For example, in some orientations, both antennas 40-1 and 40-2 in FIG. 5 may be unsatisfactorily detuned. As such, it may be desirable to provide devices with more than two antennas (or more than two switchable feeds and return paths in the example of FIG. 3). FIG. 6 shows an illustrative electronic device 10 that may be rotationally symmetric about axis 118. In particular, device 10 may include more than two antennas such as antennas 40-1, 40-2, 40-3, and 40-4. Antennas 40-1, 40-2, 40-3, and 40-4 may each have a respective antenna resonating element (e.g., antenna resonating element arms 104-1, 104-2, 104-3, and 104-4). Antennas 40-1, 40-2, 40-3, and 40-4 may also have corresponding return paths and corresponding antenna feeds such as return path 106 and feed 108, which are omitted from FIG. 6 for the sake of clarity.

The antenna resonating elements for antennas 40-1, 40-2, 40-3, and 40-4 have the same length and/or perimeter. In other words, these antenna resonating elements may cover the same frequency bands. However, if desired, antenna resonating elements for antennas 40-1, 40-2, 40-3, and 40-4 may have different lengths and/or perimeters such that one or more of antennas 40-1, 40-2, 40-3, and 40-4 cover different frequency bands.

The antenna resonating elements may all be formed on a shared device component (e.g., component 156 or structure 156). Component 156 may be similar to component 116 described in connection with FIGS. 3 and 4 (e.g., component 156 may be a speaker, a battery, a sensor, a substrate, or any other component). As examples, antenna resonating elements 40-1, 40-2, 40-3, and 40-4 may share a common antenna ground formed from a portion of structure 156, may all be mounted (e.g., soldered) to component 156, etc. As shown in FIG. 6, each antenna resonating element arms 104-1, 104-2, 104-3, and 104-3 may each be formed on a respective side of component 156 (e.g., on a respective side of housing 12 or device 10). As an example, component 156 may have a circular or spherical shape. However, this is merely illustrative. If desired, component 156 may be of any suitable shape. As an example, component 156 may be any of the components described in connection with component 130 in FIG. 5.

Antennas 40-1, 40-2, 40-3, and 40-4 may be evenly distributed about axis 118. In other words, the antenna may be separated from each other by approximately 90 degrees about axis 118. If desired, antennas 40-1, 40-2, 40-3, and 40-4 may have reflective symmetry (i.e., plane symmetry) about at least two perpendicular planes of symmetry with respective to each other. Because component 156 may have a rectangular, cubic, spherical, or cylindrical shape, housing 12 may also have a rectangular, cubic, spherical, or cylindrical shape. The shape of housing 12 may also accommodate other components within device 10. The example of antennas 40-1, 40-2, 40-3, and 40-4 being evenly distributed about axis 118 is merely illustrative. If desired, antennas may be unevenly distributed about axis 118 (e.g., on one side of housing 12), may be evenly distributed on a side of component 156), etc. As an example, device 10 may include antennas that are separated from each other by 15 degrees, 30 degrees, 45 degrees, 60 degrees, etc., about axis 118. In particular, component 156 such as a battery may form a portion of an antenna ground. Antenna 40-1 may be mounted on a first side of component 156, antenna 40-2 may be mounted on a second side of component 156, antenna 40-3 may be mounted on a third side of component 156, and antenna 40-4 may be mounted on a fourth side of component 156. In other words, respective antenna resonating element arms of antennas 40-1, 40-2, 40-3, and 40-4 may be formed on the first, second, third, and fourth sides of component 156, respectively.

Housing 12 may include main body portion 152 that surrounds component 156. Main body portion 152 may house control circuitry, processing circuitry, transceiver circuitry, antennas, a battery, and any other suitable components, as described in connection with FIG. 5. Housing 12 may also include protruding portion 154 that may house a speaker port and other suitable components. Alternatively, protruding portion 154 may be omitted and the speaker port may be formed from main body portion 152 of housing 12. Housing 12, which encloses symmetrical components within device 10 (e.g., symmetrical antenna structures 40-1, 40-2, 40-3, and 40-4) may have reflective symmetry about at least two perpendicular planes of symmetry.

Device 10 in FIG. 6 may also include transceiver circuitry and switching circuitry (e.g., transceiver circuitry 114 and switching circuitry 120 as shown in FIG. 4). Each of antennas 40-1, 40-2, 40-3, and 40-4 may be selectively coupled (via respective antenna feeds) to the transceiver circuitry using the switching circuitry. In other words, the control circuitry in device 10 may control the switching circuitry to selectively couple an antenna, such as antenna 40-1, to the transceiver circuitry. As an example, the coupling of a particular antenna (e.g., the most optimal of the antennas on device 10, antenna 40-1) via the switching circuitry may be exclusive. In other words, when antenna 40-1 is coupled to the transceiver circuitry, antennas 40-2, 40-3, and 40-4 may be decoupled from the transceiver circuitry.

Control circuitry in device 10 may select an optimal antenna to be used in device 10 based on the operating environment of device 10 (e.g., an antenna that is least susceptible to loading and detuning in the current environment, an antenna that is located furthest way from higher-density portion of a user's ear, an antenna facing away from a user's head). As an example, when the performance of antennas 40-2, 40-3, and 40-4 are hindered by an external object (e.g., a user's torso, portions of a user's ear, etc.), the control circuitry may select and activate antenna 40-1 as the optimal antenna. As another example, when the performance of antennas 40-1, 40-2, and 40-3 is hindered by an external object, the control circuitry may select and activate antenna 40-4 as the optimal antenna. By placing the most optimal antenna into use, device 10 may adapt to the environment in real-time such that a user no longer has to focus on how device 10 is oriented when placed the user's ear. As previously described in connection with FIG. 5, because device 10 in FIG. 6 includes symmetrical antenna structures (e.g., antennas 40-1, 40-2, 40-3, and 40-4), device 10 in FIG. 6 may be placed in the user's left or right ears and the active antenna may be selected in real time to compensate for any potential detuning.

Alternatively, two or more antennas 40-1, 40-2, 40-3, and 40-4 (e.g., both antennas 40-1 and 40-4) may be coupled to transceiver circuitry simultaneously. In this scenario, antennas 40-1, 40-2, 40-3, and 40-4 may be configured to cover communications over different frequency bands, perform MIMO (multiple-input-multiple-out) functions over the same frequencies, perform transmitting and receiving functions separately, etc., as examples. Additionally, control circuitry 16 on device 10 may configure the switching circuitry to select more than one of antennas 40-1, 40-2, 40-3, and 40-4 as active antennas that mitigate detuning issues associated with the presence of the body of the user or other objects. The example of device 10 in FIG. 6 is merely illustrative. If desired, device 10 in FIG. 6 may include two antennas, three antennas, more than four antennas, etc. One or more of the antennas in device 10 may have the same shape or different shapes. The antennas may be located at any desired location on device 10.

Details regarding the antenna feeds, return paths, transceiver circuitry, switching circuitry associated with the antennas structures for device 10 are omitted from FIGS. 5 and 6 for the sake of clarity. In particular, device 10 in FIG. 5 may also include antenna feeds, return paths, transceiver circuitry, and switching circuitry such as feeds 108-1 and 108-2, return paths 106-1 and 106-2, transceiver circuitry 114, and switching circuitry 120 as shown in FIG. 4. Additionally, device 10 in FIG. 6 may also include antenna feeds, return paths, transceiver circuitry, and switching circuitry similar to those shown in FIG. 4. As an example, switching circuitry may be interposed between each antenna feed of an antenna (e.g., antennas 40-1, 40-2, 40-3, and 40-4) and transceiver circuitry. Control circuitry may be coupled to the switching circuitry to selectively activate one of the antennas.

Figure 7:
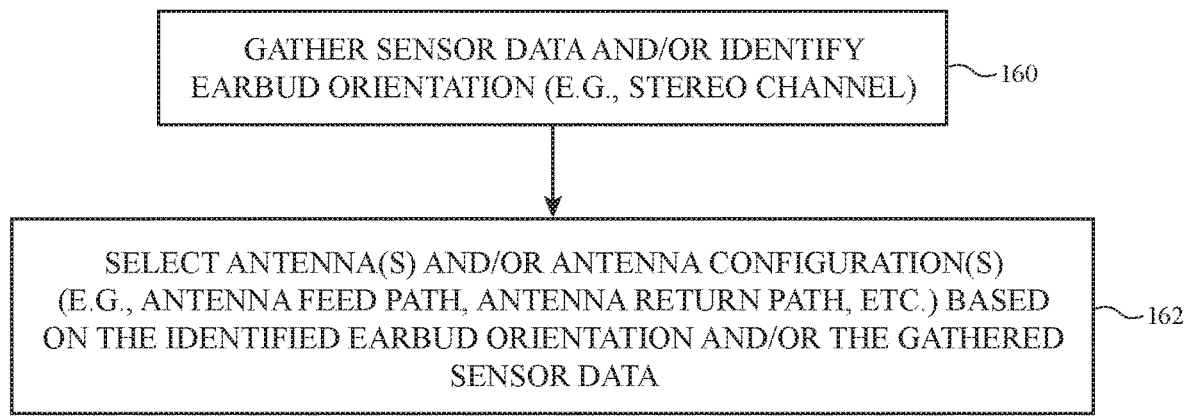
FIG. 7 is a flowchart of illustrative steps that may be performed by an electronic device to wirelessly communicate using antennas of the types shown in FIGS. 3-6 in accordance with an embodiment.

FIG. 7 is a flowchart of illustrative steps for operating (e.g., configuring) devices having antennas structures of the types shown in FIGS. 3-6. At step 160, sensor circuitry (e.g., sensors 20 in FIG. 1) on device 10 may gather sensor data reflective of the operating environment of device 10. As examples, sensors 20, such as accelerometers, optical sensors, gyroscopes, proximity sensors (e.g., capacitive proximity sensors), ambient light sensors, and/or any other sensors, may gather sensor data associated with the relative motion, position, and/or orientation of device 10 (e.g., data indicative of whether a user has placed device 10 in a left ear, a right ear, or no ear and optionally indicative of how the device is oriented within the ear). If desired, electronic device 8 in FIG. 1 may also provide sensor data to device 10 via communications link 36 to determine the relative motion, position, and/or orientation of device 10 (e.g., electronic device 8 may provide user input to device 10 regarding earbud position). If desired, control circuitry 16 in device 10 may identify a stereo channel based on the placement of device 10. As an example, device 10 may also receive user input to determine the orientation of an earbud.

If desired, control circuitry 16 may monitor the signal quality of link 8 by gathering wireless performance metric data as sensor data associated with communications links 36 and 38. The wireless performance of devices 10 and 10' (e.g., the quality of communications link 36) may be characterized by one or more wireless performance metrics (e.g., radio-frequency performance metrics). Device 10 (e.g., control circuitry 16 or other circuitry on device 10) or device 8 may obtain data associated with wireless performance metrics. As an example, device 10 or 8 may generate wireless performance metric data and/or may receive wireless performance metric data from other devices.

As examples, device 10 may obtain wireless performance metric data associated with wireless performance metrics such as received power, receiver sensitivity, receive band noise (e.g., a receive band noise floor voltage level), frame error rate, bit error rate, packet error rate, channel quality measurements based on received signal strength indicator (RSSI) information, adjacent channel leakage ratio (ACLR) information (e.g., ACLR information in one or more downlink frequency channels), any desired combination of these performance metrics, rates of change over time of these performance metrics, and other information that is reflective of the performance of wireless circuitry on device 8 and/or device 10. If desired, device 10 may gather wireless performance metric data on a per-antenna/per-antenna feed basis to determine the performance of each antenna and select an optimally performing antenna that may be activated in step 162. As an example, antennas 40-1 and 40-2 of device 10 in FIG. 5 may transmit test signals, and sensor circuitry on device 10 may generate wireless signal metrics data that determine whether antenna 40-1 is detuned. In response to determining that antenna 40-1 is detuned, control circuitry 16 may determine that device 10 is placed in a left ear of the user.

At step 162, control circuitry 16 may configure antennas structures on device 10 with the appropriate settings (e.g., place one or more optimal antennas into active operation) based on the earbud orientation and/or gathered sensor data. As an example, in response to determining the relative positioning between antennas 40-1 and 40-2 based on the performance of the antennas, control circuitry 16 may activate the upper antenna (e.g., the antenna pointing towards the top of the user's ear or the sky) and deactivate the lower antenna (e.g., the antenna pointing towards the user's torso or the ground), as the lower antenna is more likely to be significantly detuned by the presence of the body of the user (e.g., due to a higher physiological density in the bottom part of a user's ear than the top part of the user's ear). As another example, in response to determining the relative positioning of antenna portions 41-1 and 41-2 in within device 10 in the example of FIG. 3, control circuitry may activate an upward facing portion such as portion 41-1 of antenna structures 40 (e.g., control circuitry may control switching circuitry to couple antenna feed 108-1 to transceiver circuitry 114 and to couple resonating element arm 104 to ground 102 using return path 106-1). If desired, device 10 may communicate with device 8 to convey configuration information of device 10 to device 8 (e.g., device 8 may receive information from device 10 that device 10 is in a left ear of the user). In response, device 8 may provide device 10 with an appropriate audio stream (e.g., a left-channel audio stream). These examples are merely illustrative. If desired, any suitable configuration of antenna structures on device 10 may be used.

Control circuitry may perform steps 160 and 162 in real-time, continuously, when prompted by user input, at a given time interval or frequency. As an example, sensor circuitry may be prompted to collect sensor data to determine device orientation, when awaken by the user (e.g. in response to touch, or in response to other stimuli). After device 10 is properly configured (e.g., after processing steps 160 and 160 one or more times), device 10 may perform operations such as receiving audio data over an antenna of device 10 and playing the audio data without interruption. The illustrative flowchart of FIG. 7 may be performed continuously to update the configuration of device 10 (e.g., when the orientation of device 10 changes, when device 10 is removed from an ear, when device 10 is moved to the other ear, etc.).

Figure 8:
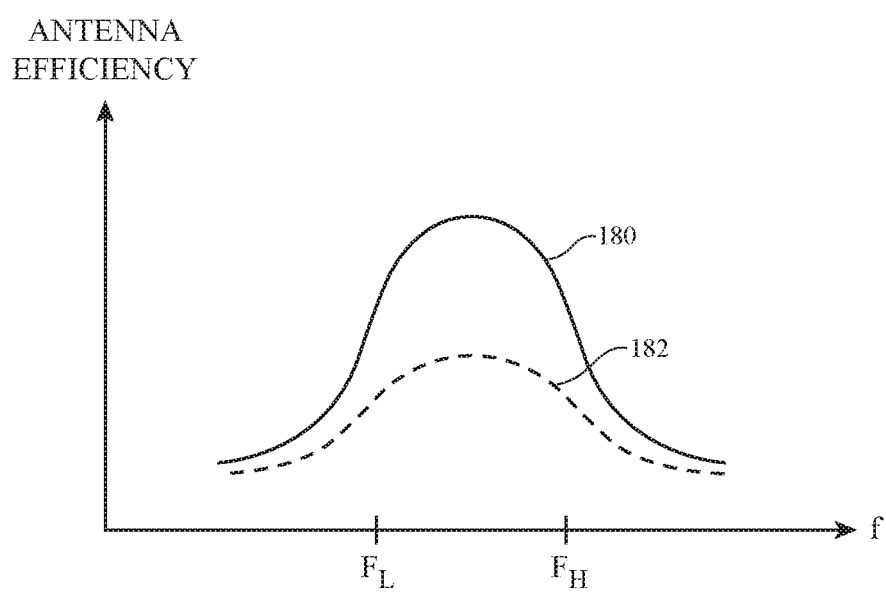
FIG. 8 is a graph of illustrative antenna efficiency curves for antenna structures operating in multiple antenna configurations in accordance with an embodiment.

FIG. 8 shows a diagram of illustrative antenna efficiency curves for antennas configured in multiple configurations such as the illustrative antennas described in connection with FIGS. 3-6. In particular, FIG. 8 shows a graph in which antenna efficiency has been plotted as a function of frequency. As described in connection with FIGS. 3-6, an object in close proximity to a feed for an antenna may significantly detune the antenna. In order to mitigate the detuning of the antenna, antenna structures may be provided with multiple configurations that include multiple switchable feeds and/or antennas, and an optimal feed and/or antenna may be selected and activated.

For example, as described in connection with FIG. 4, the antennas structures 40 may be configured to activate either feed 108-1 or 108-2. An active feed such as feed 108-1 may be selected instead of feed 108-2 when an object is located at location Y in FIG. 4. Curve 180 in FIG. 8 provides an illustrative antenna efficiency curve for antenna structures having an optimal active feed (e.g., feed 108-1 in the presence of an object at location Y in FIG. 4). Curve 182 in FIG. 8 provides an illustrative antenna efficiency curve for antenna structures having a suboptimal feed (e.g., feed 108-2 in the presence of an object at location Y in FIG. 4). When configuring antenna structures to use a suboptimal feed, antenna efficiency suffers over all frequencies in a frequency band (e.g., all frequencies between frequency $F_L$ and $F_H$). As such, performing communications operations at a desired frequency (e.g., Bluetooth® frequency band center at 2.4 GHz) using the antenna structures may be severely degraded. However, by selecting an optimal active feed, antenna structure may perform communications operations with enhanced efficiency when compared to the scenario in which a suboptimal feed is used.

This example is merely illustrative. If desired, antenna structures as shown in FIGS. 4-6 may similarly select an optimal active antenna and/or antenna feed to perform communications operations with enhance efficiency in the presence of an external object. Multiple bands may be covered if desired.

The foregoing is merely illustrative and various modifications can be made by those skilled in the art without departing from the scope and spirit of the described embodiments. The foregoing embodiments may be implemented individually or in any combination.

What is claimed is:

1. A wireless earbud, comprising:
   a housing having a speaker port;
   a speaker in the housing and aligned with the speaker port;
   control circuitry in the housing and configured to identify sensor data; and
   first and second antennas in the housing and coupled to the control circuitry, wherein the control circuitry is configured to selectively activate a given one of the first and second antennas based on the identified sensor data.

2. The wireless earbud defined in claim 1, wherein the first antenna comprises a first antenna feed, and the second antenna comprises a second antenna feed, the wireless earbud further comprising:
   transceiver circuitry in the housing;
   a first radio-frequency transmission line coupled between the first antenna feed and the transceiver circuitry; and
   a second radio-frequency transmission line coupled between the second antenna feed and the transceiver circuitry.

3. The wireless earbud defined in claim 2, further comprising:
   switching circuitry interposed between the transceiver circuitry and the first antenna feed, and interposed between the transceiver circuitry and the second antenna feed, wherein the control circuitry is configured to selectively activate the given one of the first and second antennas by adjusting the switching circuitry.

4. The wireless earbud defined in claim 1, further comprising:
   sensor circuitry configured to generate the sensor data and to provide the generated sensor data to the control circuitry.

5. The wireless earbud defined in claim 4, wherein the sensor circuitry comprises an accelerometer, and the sensor data comprises orientation data indicative of an orientation of the wireless earbud.

6. The wireless earbud defined in claim 4, wherein the sensor circuitry comprises a proximity sensor, and the sensor data comprises proximity sensor data.

7. The wireless earbud defined in claim 1, wherein the control circuitry is configured to receive the sensor data from an external device via the first antenna.

8. The wireless earbud defined in claim 1, wherein the first antenna comprises a first inverted-F antenna having a first antenna resonating element arm coupled to an antenna ground via a first return path and the second antenna comprises a second inverted-F antenna having a second antenna resonating element arm coupled to the antenna ground via a second return path.

9. The wireless earbud defined in claim 8, wherein the first antenna resonating element arm has first and second opposing ends, the second antenna resonating element arm has third and fourth opposing ends, the second end of the first antenna resonating element faces the third end of the second antenna resonating element, the first return path is coupled to the first end of the first antenna resonating element, and the second return path is coupled to the fourth end of the second antenna resonating element.

10. The wireless earbud defined in claim 8, further comprising:
    a battery, wherein a portion of the battery forms a portion of the antenna ground, the first return path is coupled to the antenna ground at a first side of the battery, and the second return path is coupled to the antenna ground at a second side of the battery that opposes the first side.

11. The wireless earbud defined in claim 10, wherein the first side of the battery comprises a first curved surface and the first antenna resonating element arm extends parallel to the first curved surface, and the second side of the battery comprises a second curved surface and the second antenna resonating element arm extends parallel to the second curved surface.

12. A wireless earbud, comprising:
a housing having an opening;
a speaker in the housing and aligned with the opening;
antenna structures in the housing;
an antenna ground;
first and second antenna feeds coupled between the antenna structures and the antenna ground;
transceiver circuitry in the housing;
switching circuitry coupled between the first antenna feed and the transceiver circuitry, and between the second antenna feed and the transceiver circuitry; and
control circuitry configured to identify sensor data and to control the switching circuitry to selectively couple a given one of the first and second antenna feeds to the transceiver circuitry based on the identified sensor data.

13. The wireless earbud defined in claim 12, wherein the antenna structures comprise a resonating element arm and a first return path coupled between a first end of the resonating element arm and the antenna ground.

14. The wireless earbud defined in claim 13, wherein the antenna structures comprise an additional resonating element arm and a second return path coupled between a second end of the additional resonating element arm and the antenna ground.

15. The wireless earbud defined in claim 14, wherein the control circuitry is configured to control the switching circuitry to couple the first antenna feed to the transceiver circuitry and decouple the second antenna feed from the transceiver circuitry in a first configuration for the antenna structures and to couple the second antenna feed to the transceiver circuitry and decouple the first antenna feed from the transceiver circuitry in a second configuration for the antenna structures.

16. A system, comprising:
a first earbud that comprises a first housing, a first speaker port in the first housing, a first speaker in the first housing that is aligned with the first speaker port, and first control circuitry in the first housing that is configured to identify sensor data; and
a second earbud that is configured to wirelessly communicate with the first earbud and that comprises a second housing, a second speaker port in the second housing, a second speaker in the second housing that is aligned with the second speaker port, antenna structures in the second housing that include first and second antenna feeds, and second control circuitry in the second housing that is configured to control the antenna structures to convey radio-frequency signals over a selected one of the first and second antenna feeds based on the identified sensor data.

17. The system defined in claim 16, wherein the first earbud further comprises additional antenna structures in the first housing that include third and fourth antenna feeds, wherein the first control circuitry is configured to control the additional antenna structures to convey additional radio-frequency signals over a selected one of the third and fourth antenna feeds.

18. The system defined in claim 17, wherein the first earbud further comprises sensor circuitry in the first housing that is configured to generate the sensor data and the first earbud is configured to wirelessly transmit the sensor data to the second earbud.

19. The system defined in claim 17, wherein the second earbud further comprises sensor circuitry in the second housing that is configured to generate the sensor data and the second earbud is configured to wirelessly transmit the sensor data to the first earbud.

20. The system defined in claim 19, wherein the first control circuitry is configured to control the additional antenna structures to convey the additional radio-frequency signals over the selected one of the third and fourth antenna feeds based on the sensor data.

* * * * *